United States Patent
McDonnell et al.

(10) Patent No.: US 7,243,214 B2
(45) Date of Patent: Jul. 10, 2007

(54) STALL OPTIMIZATION FOR AN IN-ORDER, MULTI-STAGE PROCESSOR PIPELINE WHICH ANALYZES CURRENT AND NEXT INSTRUCTIONS TO DETERMINE IF A STALL IS NECESSARY

(75) Inventors: Niall D. McDonnell, Limerick (IE); John Wishneusky, Fitzwilliam, NH (US)

(73) Assignee: Intel Corporation, Santa Clara, CA (US)

( * ) Notice: Subject to any disclaimer, the term of this patent is extended or adjusted under 35 U.S.C. 154(b) by 420 days.

(21) Appl. No.: 10/419,360

(22) Filed: Apr. 21, 2003

(65) Prior Publication Data

US 2004/0210740 A1    Oct. 21, 2004

(51) Int. Cl.
*G06F 9/30* (2006.01)
(52) U.S. Cl. .................. 712/214; 712/212; 712/219
(58) Field of Classification Search ........... 712/219, 712/212, 214
See application file for complete search history.

(56) References Cited

U.S. PATENT DOCUMENTS

| | | | | |
|---|---|---|---|---|
| 5,133,069 A | * | 7/1992 | Asato et al. ............... 713/401 |
| 5,325,495 A | * | 6/1994 | McLellan ................. 712/219 |
| 5,404,552 A | * | 4/1995 | Ikenaga ..................... 712/41 |
| 5,860,018 A | * | 1/1999 | Panwar ...................... 712/23 |
| 6,035,422 A | * | 3/2000 | Hohl et al. .................. 714/35 |
| 6,163,840 A | * | 12/2000 | Chrysos et al. ........... 712/227 |
| 6,341,324 B1 | * | 1/2002 | Caulk et al. .............. 710/260 |
| 2001/0007125 A1 | * | 7/2001 | Cofler et al. ............. 712/226 |

* cited by examiner

*Primary Examiner*—Donald Sparks
*Assistant Examiner*—Vincent Lai
(74) *Attorney, Agent, or Firm*—Buckley, Maschoff & Talwalkar LLC

(57) ABSTRACT

According to some embodiments, a method determining a number of stages associated with an instruction to be executed via a processor pipeline, determining a number of stages associated with a subsequent instruction, and stalling the pipeline based on the number of stages associated with the instruction to be executed and the number of stages associated with the subsequent instruction is provided.

11 Claims, 11 Drawing Sheets

| | XFRCM [i0, #4] | XFRCM [i0, #4] |
|---|---|---|
| C0 | FETCH | |
| C1 | DECODE: GET i0 | FETCH |
| C2 | ALU: ADD 4 TO i0 | DECODE: GET i0 |
| C3 | D/M 1: WRITE i0 TO RF GET COP VALUE | ALU: ADD 4 TO i0 |
| C4 | D/M 2: WRITE VALUE TO DMEM | D/M 1: WRITE i0 TO RF GET COP VALUE |
| C5 | | D/M 2: WRITE VALUE TO DMEM |

FIG. 4

STALL OPTIMIZATION FOR AN IN-ORDER, MULTI-STAGE PROCESSOR PIPELINE WHICH ANALYZES CURRENT AND NEXT INSTRUCTIONS TO DETERMINE IF A STALL IS NECESSARY

BACKGROUND

An instruction to be executed by a processor may be associated with a number of different operations. For example, execution of an instruction might involve: fetching the instruction; decoding the instruction; performing an Arithmetic-Logic Unit (ALU) operation; and accessing data/memory. The processor could perform all of these operations for one instruction before beginning any of the operations for the next instruction. This approach, however, may limit the rate at which the processor executes instructions.

It is known that processor performance may be improved when instructions are executed via a processor "pipeline." FIG. 1 is a block diagram of a processor pipeline 100 including a fetch stage 110 that retrieves an instruction from memory and increments a program counter. A decode stage 120 may translate that instruction and retrieve information from a register file. The pipeline 100 may also include an ALU stage 130 that performs arithmetic and logic operations on operands (e.g., information that was retrieved from the register file during the decode stage 120). A data/memory stage 140 may read and/or write information as appropriate. Some instructions may further have a second data/memory stage 150. For example, an instruction that reads from memory or that accesses a coprocessor might have a second data/memory stage 150.

Note that each stage in the pipeline 100 may simultaneously perform operations associated with different instructions. For example, the fetch stage 110 may retrieve a first instruction from memory during a first clock cycle. When that operation is complete, the decode stage 120 can decode the first instruction and retrieve information from a register file during a second clock cycle. While the decode stage 120 is performing these operations for the first instruction, the fetch stage 110 can retrieve the next instruction from memory. Because the pipeline 100 may perform operations associated with a number of different instructions at the same time, the rate at which the instructions are executed may be increased.

BRIEF DESCRIPTION OF THE DRAWINGS

FIG. 4 is an example of a five-stage instruction followed by another five-stage instruction in a processor pipeline.

DETAILED DESCRIPTION

Figure 1:
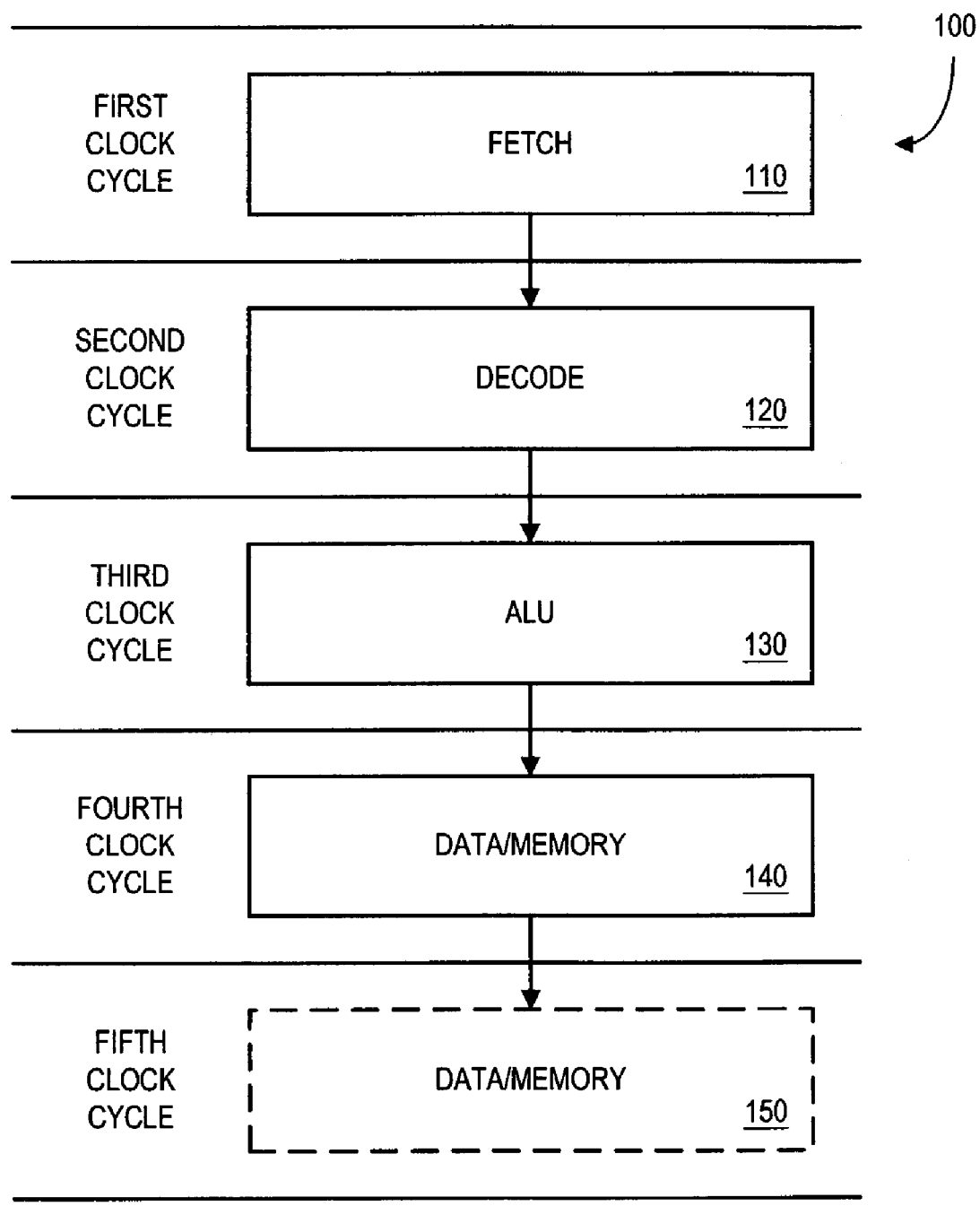
FIG. 1 is a block diagram of a known processor pipeline.

A processor pipeline, such as the one described with respect to FIG. 1, might be able to execute instructions having different numbers of stages (e.g., the pipeline might execute both four-stage and five-stage instructions). It may be important to efficiently reduce the likelihood that an operation associated with one instruction will interfere with an operation associated with another instruction. Moreover, it may be important to facilitate the performance of the pipeline without causing problems when a series of instructions are being debugged (e.g., when a programmer halts the pipeline, inspects and perhaps changes information, and restarts the pipeline).

Stall Optimization

Figure 2:
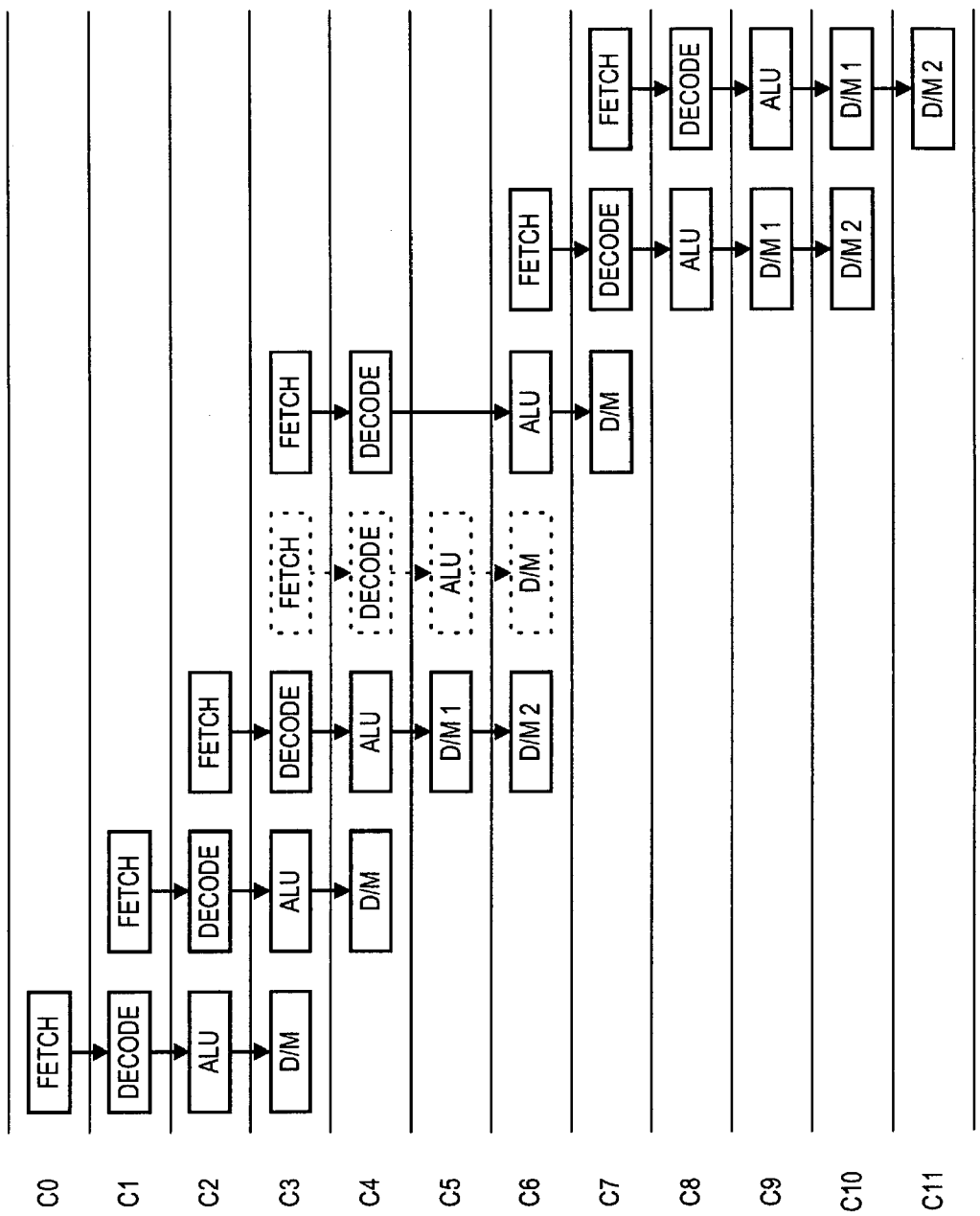
FIG. 2 illustrates instructions being executed via a processor pipeline according to some embodiments.

Refer now to FIG. 2, which illustrates instructions being executed via a processor pipeline according to some embodiments. As can be seen, a four-stage instruction begins with the fetch stage during an initial clock cycle (C0) and propagates through the pipeline. Another four-stage instruction begins in C1, and a five-stage instruction begins in C2.

Note that the five-stage instruction includes two data/memory stages (D/M 1 and D/M 2). Consider now what might happen if a four-stage instruction were to begin in C3 and propagate through the pipeline as before (illustrated with dashed lines in FIG. 2). In this case, both the five-stage instruction and the subsequent four-stage instruction would attempt to perform data/memory operations at the same time (e.g., the data/memory operations would collide during C6).

To avoid this, the pipeline could be halted or "stalled" every time a five-stage instruction is performed. That is, the operation of subsequent instructions may be delayed (e.g., by one clock cycle) so that a subsequent four-stage instruction's D/M will not interfere with the five-stage instruction's D/M 2. Note that only a portion of the pipe might be delayed when the pipeline is stalled. For example, as illustrated in FIG. 2, the pipeline may be stalled for one clock cycle after the four-stage instruction's decode operation (e.g., the decode operation is performed during C4 and the ALU operation is performed during C6 instead of C5).

Note, however, that it may be possible to execute a five-stage instruction followed by another five-stage instruction without stalling the pipeline. Consider the five-stage instructions that begin in C6 and C7. In this case, the instructions may exchange information with a register file during D/M 1 and with a data memory during D/M 2. As a result, the first instruction's D/M 2 may be performed at the same time as the second instruction's D/M 1 without causing a problem (e.g., no pipeline stall may be required). This overlapping of five stage instructions is referred to as "stall optimization" (e.g., because the stall cycles have be removed—which may result in better performance for this sequence of instructions).

Figure 3:
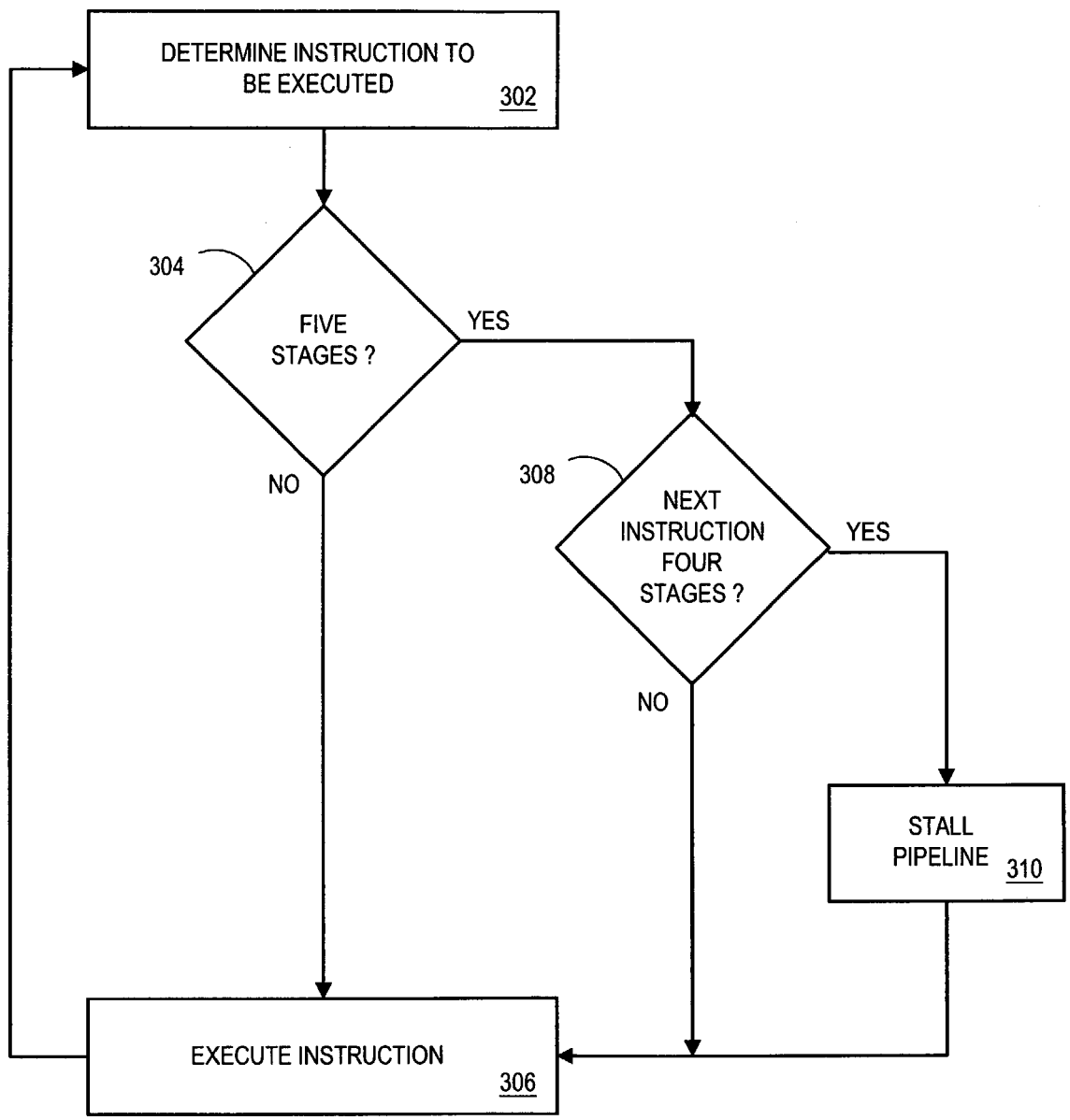
FIG. 3 is a flow chart of a method of stall optimization according to some embodiments.

FIG. 3 is a flow chart of a method of stall optimization according to some embodiments. The flow charts described herein do not necessarily imply a fixed order to the actions, and embodiments may be performed in any order that is practicable. The method of FIG. 3 may be associated with, for example, a pipeline that executes both four-stage and five-stage instructions, such as the one described with respect to FIG. 1. Note that any of the methods described herein may be performed by hardware, software (including microcode), or a combination of hardware and software. For example, a storage medium may store thereon instructions that when executed by a machine result in performance according to any of the embodiments described herein.

At 302, an instruction to be executed is determined. This may comprise, for example, determining the instruction based on a program counter and information stored in memory. The number of stages associated with the instruction may then be determined. If it is not a five-stage instruction at 304 (e.g., it is a four-stage instruction), the instruction may be executed at 306. That is, no pipeline stall may be required because a four-stage instruction will not interfere with any subsequent instruction.

If it is a five-stage instruction at 304, it is determined if the next instruction is a four-stage instruction. If the next instruction is not a four-stage instruction at 308 (e.g., it is another five-stage instruction), the instruction may be execute at 306. That is, no pipeline stall may be needed because a five-stage instruction will not interfere with a subsequent five-stage instruction. If the next instruction is four-stage instruction, the pipeline may be stalled at 310. That is, because the five-stage instruction is being followed by a four stage instruction, a stall may required to prevent D/M operations from interfering with each other. In this way, "stall optimization" may avoid unnecessary stalls, and the performance of the pipeline may be improved.

According to some embodiments, logic associated with the decode stage may determine whether or not the pipeline will be stalled. For example, the logic might make such a determination based on (i) the number of stages associated with the instruction currently being processed by the decode stage and (ii) information received from the ALU stage (e.g., indicating the number of stages associated with the instruction currently being processed by the ALU stage).

Although the present embodiment is described with respect to a pipeline that executes both four-stage and five-stage instructions, other embodiments may be associated different numbers of stages. For example, the pipeline might be stalled (e.g., for one or more clock cycles) whenever a subsequent instruction has fewer stages than an instruction being executed.

Debugging Operations

A processor may provide debugging capabilities that are used to examine and correct a series of instructions (e.g., a software program). For example, a user might start and stop operation of a processor, insert a breakpoint (e.g., causing the processor to stop after a particular instruction completes execution), and/or execute instructions one at a time (e.g., "single-stepping" through a series of instructions).

When the processor is stopped (e.g., because a breakpoint was encountered), a user can inspect the internal state of the processor. For example, the user might want to examine (and possibly change) information in the register file.

Such interventions may be performed by manually inserting and executing instructions via the pipeline (e.g., through a debugging interface). When the pipeline is used in this way, it may be cleared to remove any partially completed instructions (e.g., information associated with an idle state might be written into the appropriate registers). After the internal state of the processor is examined and/or changed, the user may restart the pipeline (e.g., and the processor resumes the normal execution of instructions).

In some cases, however, it might not be possible to halt the processor, clear the pipeline, and then restart the pipeline correctly. Consider FIG. 4, which is an example of a five-stage Xfrcm[i0, #4] instruction followed by another five-stage Xfrcm[i0, #4] instruction. The first instruction is retrieved from memory during C0 and is decoded during C1. The value "4" is added to i0 during C2, and the two data/memory stages are performed during C3 and C4. In particular, i0 is written to the Register File (RF) and a Coprocessor (COP) value is accessed during D/M 1. The appropriate value is then written to Data Memory (DMEM) during D/M 2.

The second instruction propagates through the pipeline one clock cycle behind the first instruction. Note that when the first instruction completes execution (right after C4), the second instruction's D/M 1 has been performed but it's D/M 2 has not been performed. Thus, if the processor is stopped after the first five-stage completes execution, the next instruction has already modified the state of the register file (and hence has "partially completed").

In this case, the pipeline cannot be safely or "cleanly" cleared and restarted (e.g., clearing and restarting the pipeline may change the result of a series of instructions). Refer again to FIG. 4, and assume that the processor is stopped after C4 and the pipeline is cleared. Note that at this point the second Xfrcm instruction has already added 4 to i0 and written the new value into the register file. If the second Xfrcm instruction is executed when the pipeline is restarted (since it wasn't completely executed when the processor was stopped), the ALU stage will incorrectly again add 4 to the value in the register file.

Several approaches to this situation will now be provided (e.g., disabling stall optimization and a clean status indication). Note that all of these approaches might be provided, none might be provided, any subset of the approaches might be provided, and/or other approaches might be provided according to various embodiments.

Disabling Stall Optimization

A user may stop a processor and examine the register file (causing the pipeline to be cleared) at a point where the pipeline cannot be safely restarted (e.g., after C4 in FIG. 4). In this case, the user might restart the program from the beginning (e.g., re-executing an entire series of instructions). This approach, however, may be inefficient (e.g., the user might repeatedly encounter such situations). Moreover, the user may be unable to change information in the register file in the middle of a program's execution and resume operation of the processor from that point (e.g., to see how the changed information impacts the operation of the program).

Figure 5:
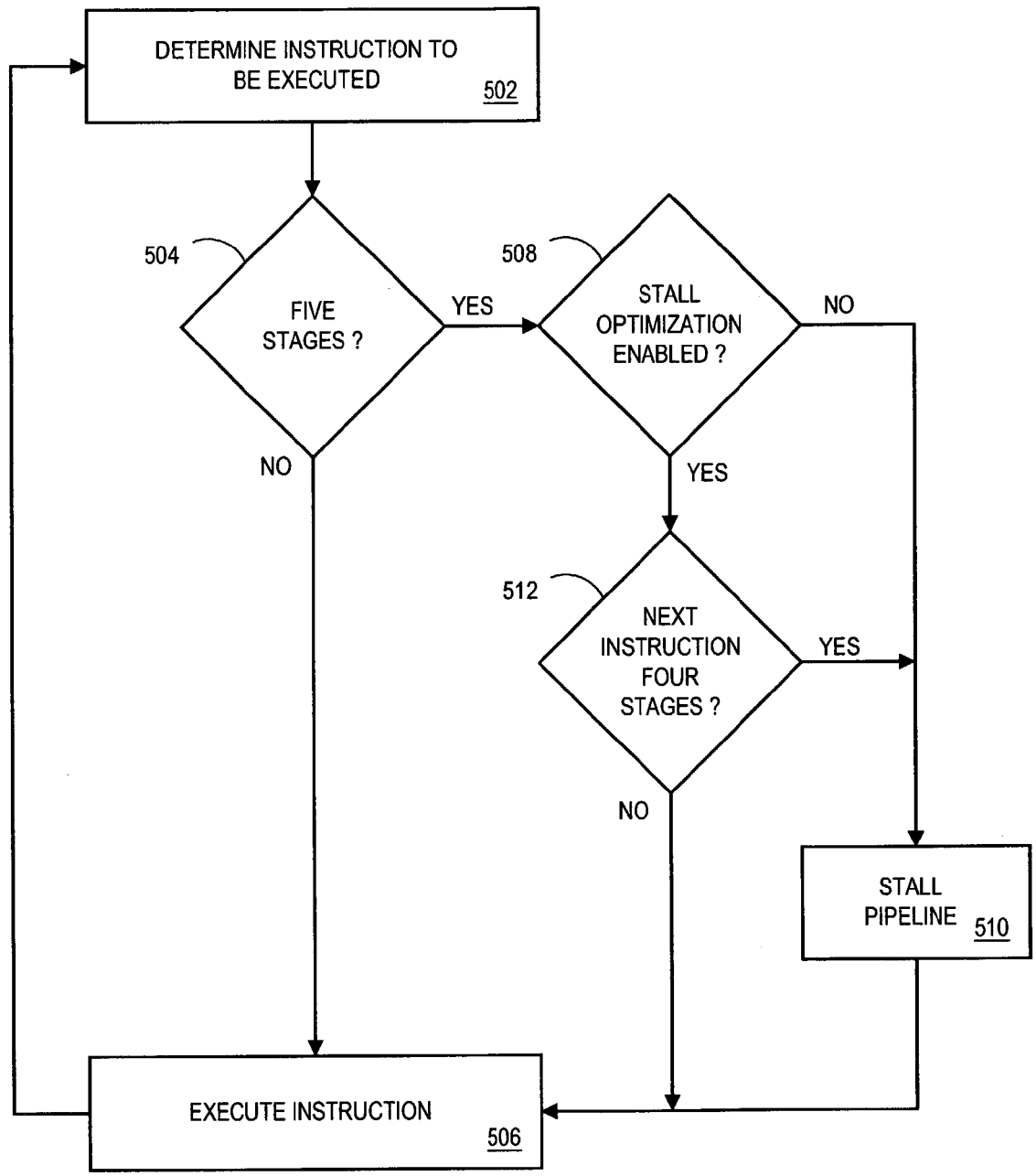
FIG. 5 is a flow chart of a method of stall optimization according to some embodiments.

According to some embodiments, a user (or a debugging application) may enable or disable stall optimization for a processor pipeline. For example, FIG. 5 illustrates a method in which an instruction to be executed is determined at 502 (e.g., based on a program counter and information stored in memory). The number of stages associated with the instruction can then be determined. If it is not a five-stage instruction at 504, the instruction may be executed at 506 (e.g., no pipeline stall is required because a four-stage instruction will not interfere with any subsequent instruction).

According to this embodiment, it is then determined whether or not stall optimization is currently enabled. If stall optimization is not enabled at 508, the pipeline is always stalled at 510. That is, a five-stage instruction will always result in a pipeline stall (even when the next instruction is also a five stage-instruction). As a result, the situation described with respect to FIG. 4 may be avoided (e.g., the pipeline can always be cleared and restarted cleanly). Although the stall might be unnecessary during normal operation (thus reducing the performance of the pipeline), it may be useful during a debugging operation.

If stall optimization is enabled at 508, it is determined if the next instruction is a four-stage instruction. If the next instruction is not a four-stage instruction at 512, the instruction may be execute at 506 (e.g., no pipeline stall is required because a five-stage instruction will not interfere with a subsequent five-stage instruction). If the next instruction is four-stage instruction at 512, the pipeline is stalled at 510. That is, because the five-stage instruction is being followed by a subsequent four stage instruction a stall is provided to avoid the situation described with respect to FIG. 4.

According to some embodiments, logic associated with the decode stage may determine whether or not the pipeline will be stalled. For example, the logic might make such a determination based on (i) the number of stages associated with the instruction currently being processed by the decode stage, (ii) information received from the ALU stage (e.g., indicating the number of stages associated with the instruction currently being processed by the ALU stage), and (iii) stall optimization logic (e.g., located within the decode stage, within the ALU stage, and/or external to the pipeline).

Figure 6:
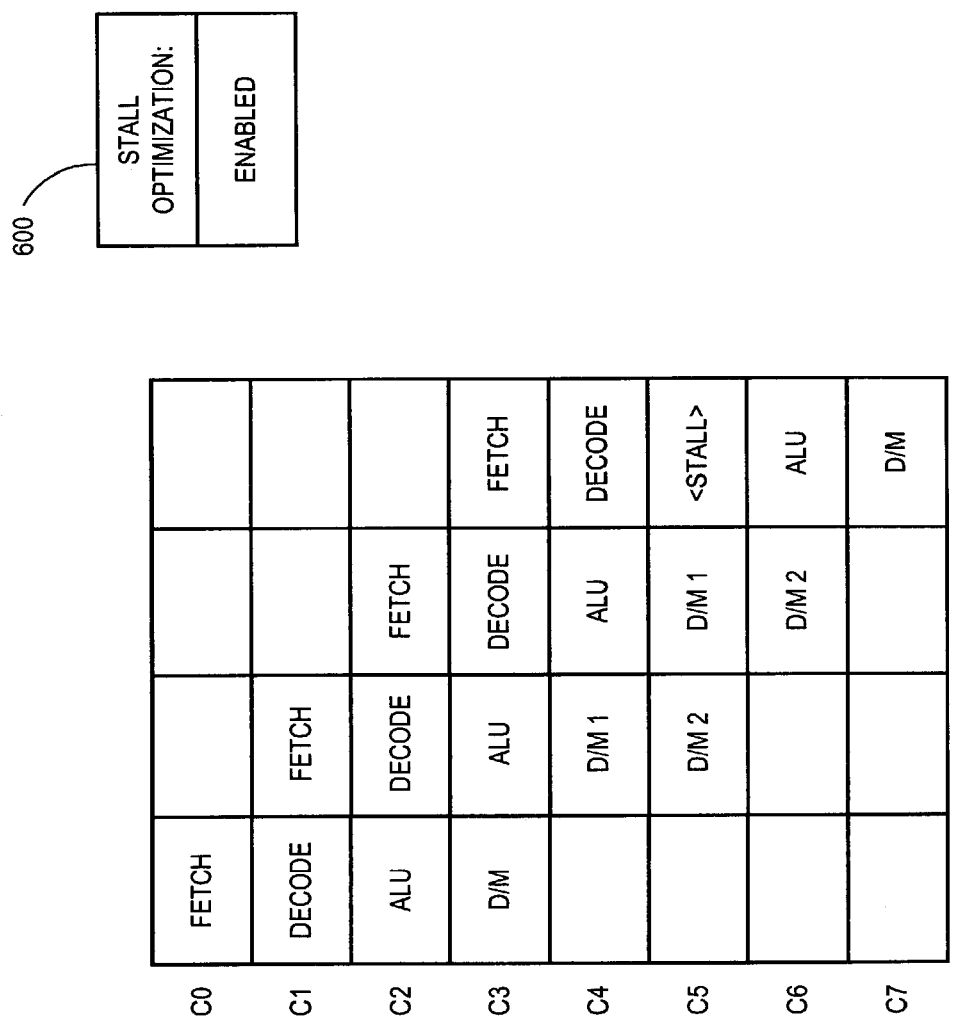
FIG. 6 illustrates instructions being executed when stall optimization is enabled according to some embodiments.

FIG. 6 illustrates instructions being executed when stall optimization 600 is enabled according to some embodiments. As can be seen, the five-stage instruction that begins to execute in C1 does not result in a pipeline stall because it is followed by another five-stage instruction (beginning in C2). The second five-stage instruction does result in a pipeline stall because it is followed by a four-stage instruction (beginning in C3). Note that the pipeline is stalled after the four-stage instruction is decoded (e.g., the pipeline is stalled during C5).

Figure 7:
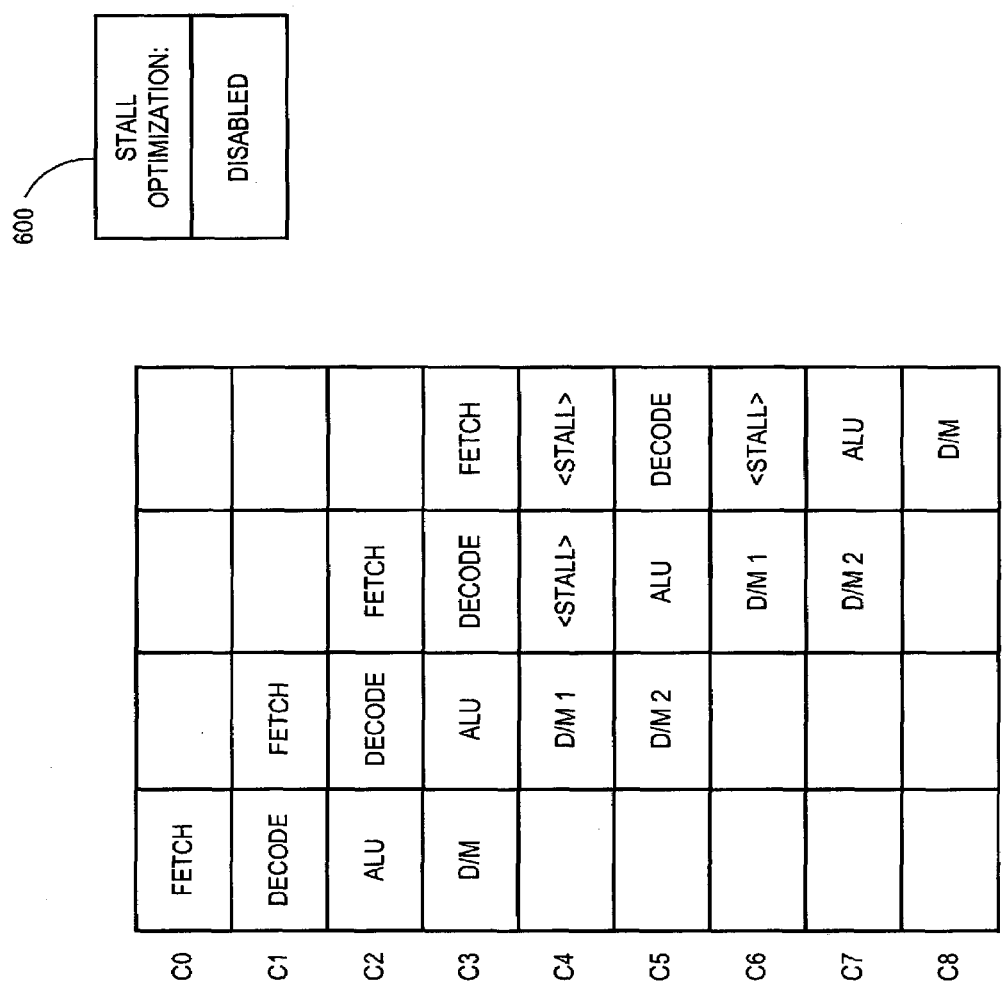
FIG. 7 illustrates instructions being executed when stall optimization is not enabled according to some embodiments.

Consider now FIG. 7, which illustrates instructions being executed when stall optimization 600 is not enabled according to some embodiments. In this case, the five-stage instruction that begins to execute in C1 results in a pipeline stall—even though it is followed by another five-stage instruction (beginning in C2). Note that the pipeline is stalled after the second five-stage instruction is decoded (e.g., the pipeline is stalled during C4). Moreover, the second five-stage instruction also results in another pipeline stall (during C6).

Clean Status Indication

A user who stops a processor at a point where the pipeline cannot be safely cleared and restarted (e.g., after C4 in FIG. 4) could decide to resume operation without examining or changing information in the register file. That is, the pipeline can be restarting without being cleared (because instructions were not manually inserted and executed via the pipeline).

Figure 8:
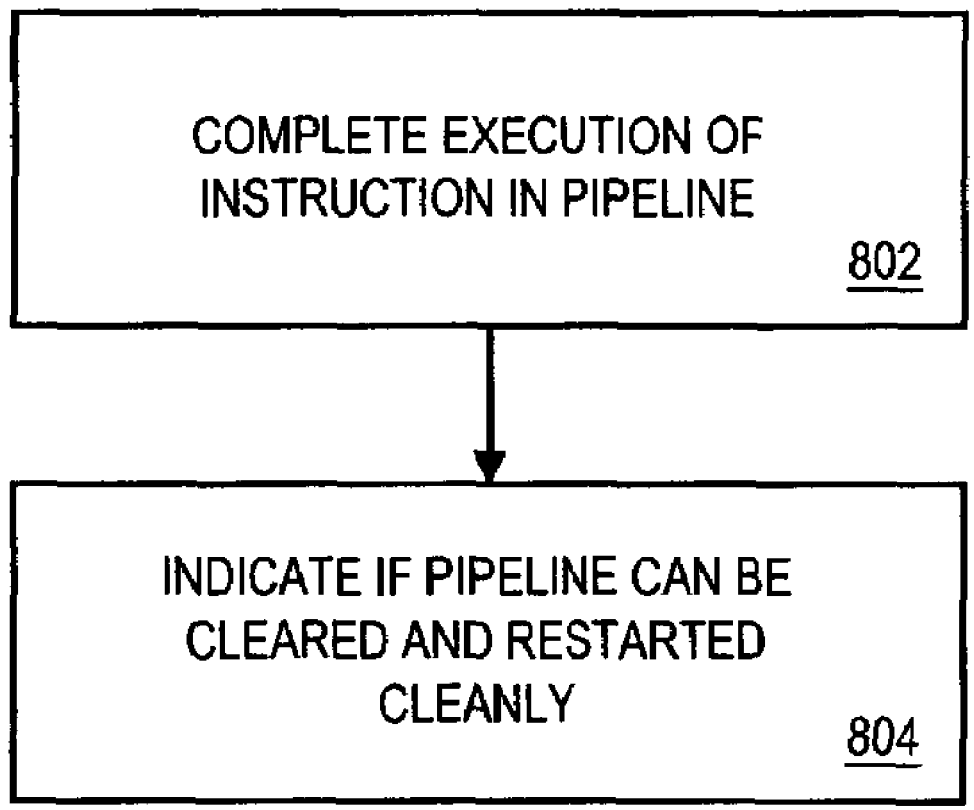
FIG. 8 is a flow chart of a method of providing a clean status indication according to some embodiments.

FIG. 8 is a flow chart of a method of providing a clean status indication to a user according to some embodiments. At 802, execution of an instruction in the pipeline is completed. An indication is then provided as to whether or not the pipeline can be cleared and restarted cleanly at 804. For example, it might be determined that the pipeline cannot be cleared and restarted cleanly if an instruction's first data/memory stage has been completed while a second data/memory stage has not been completed. As another example, the determination may be based on the number of stages associated with the instruction being executed and the next instruction.

The indication may be provided in any number of ways (e.g., it might be a value displayed to a user via a debugging application). When the user sees that the pipeline cannot be cleared and restarted cleanly, he or she might decide to resume operation without examining or changing information in the register file. The user may also examine information in the register file and restart the program from the beginning (perhaps after disabling stall optimization).

Figure 9:
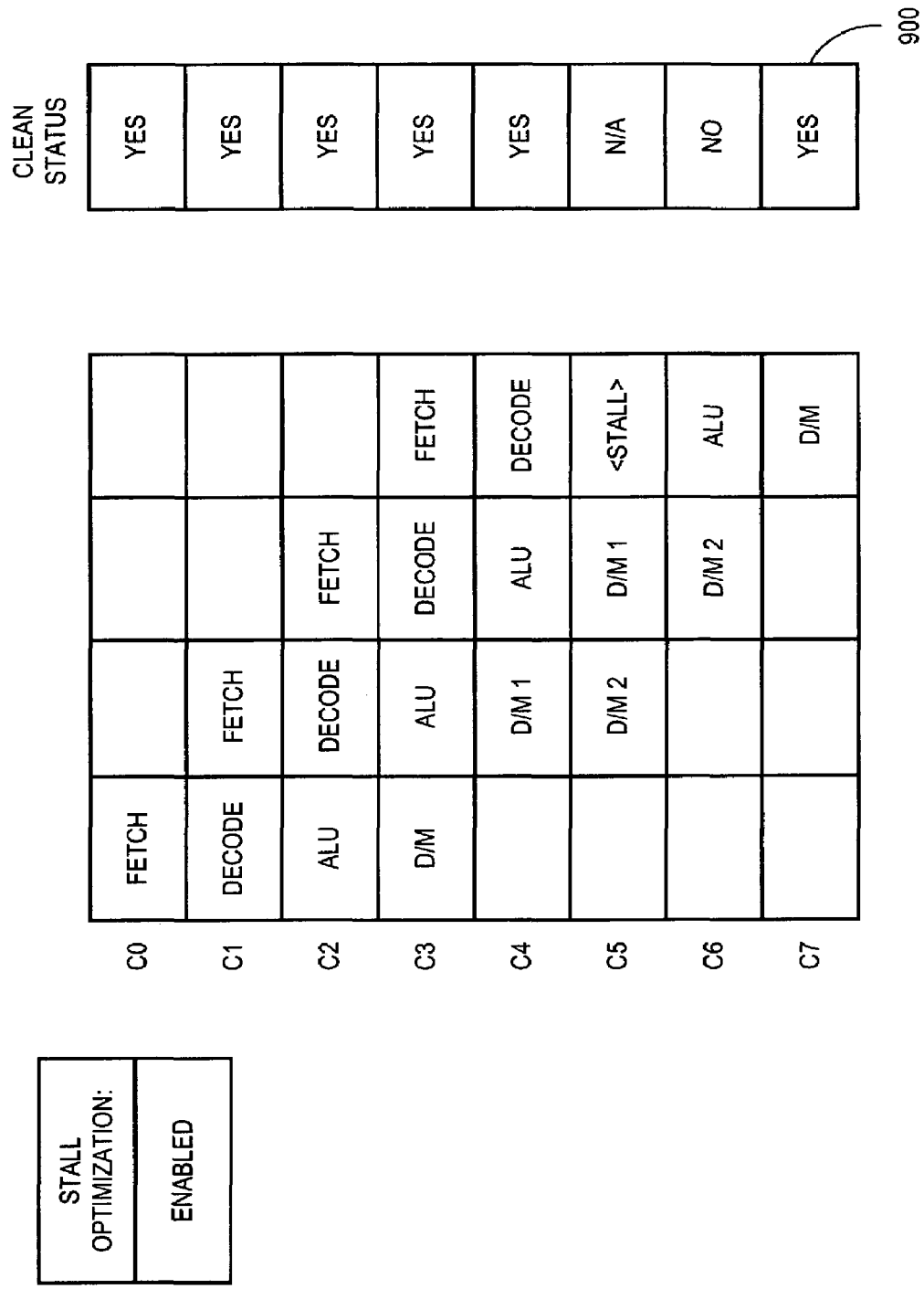
FIG. 9 illustrates clean status indications when stall optimization is enabled according to some embodiments.

FIG. 9 illustrates clean status indications 900 when stall optimization is enabled according to some embodiments. As can be seen, the five-stage instruction that begins to execute in C1 does not result in a pipeline stall because it is followed by another five-stage instruction (beginning in C2). Thus, the pipeline cannot be cleared and restarted cleanly (e.g., the clean status indication 900 may be set to NO) after the first five-stage instruction completes (after C5 completes), because the second five-stage instruction's D/M 1 has been performed but D/M 2 has not. Note that during some clock cycles no instruction has just been completed. For example, during C5 no instruction has just been completed (e.g., no instruction completed after C4). In this case, the clean status indication 900 may be set to N/A because the processor would not normally stop operation at that point as no instruction completed in the previous cycle. As another approach, the clean status indication 900 might be set to NO in this situation.

Figure 10:
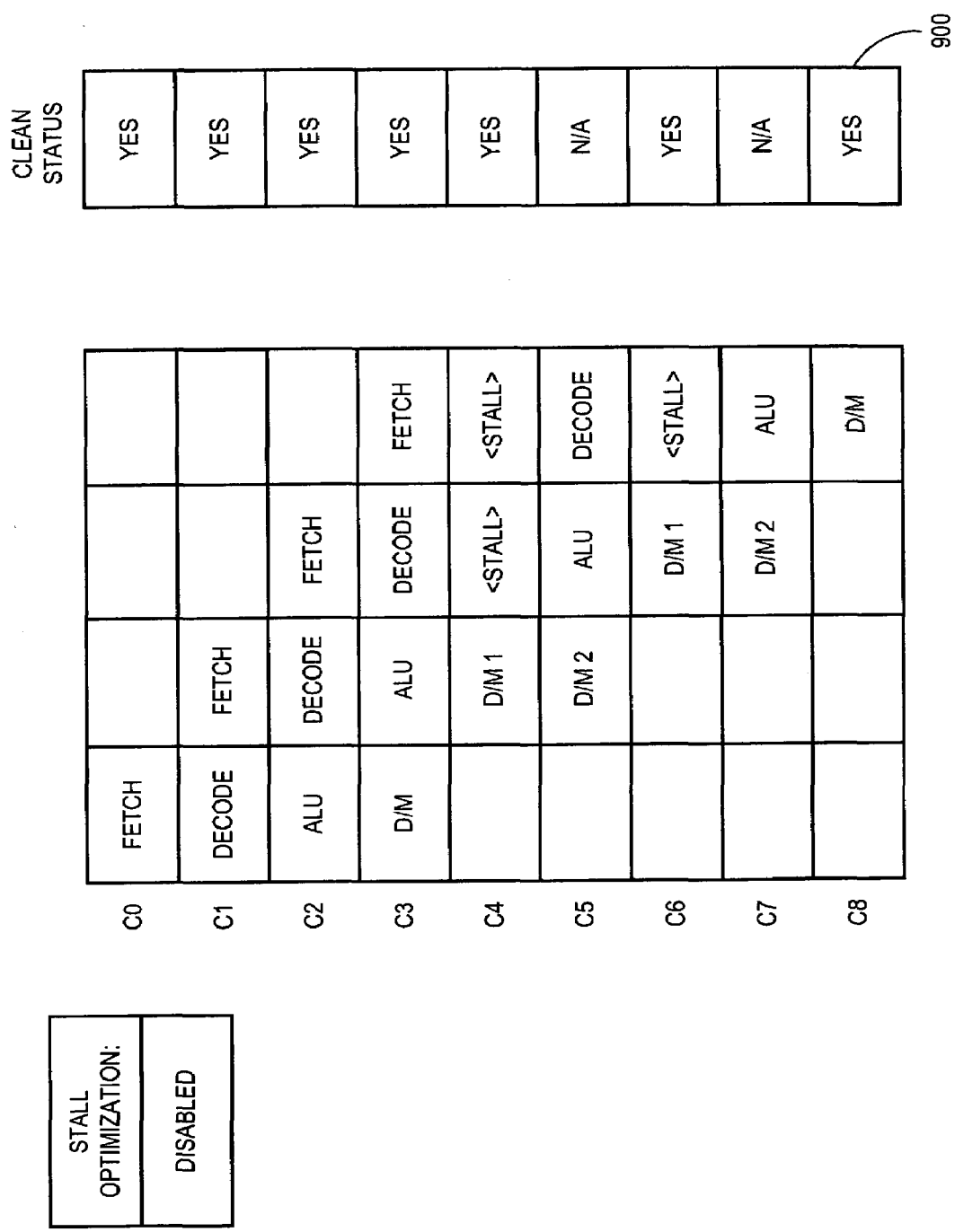
FIG. 10 illustrates clean status indications when stall optimization is not enabled according to some embodiments.

Consider now FIG. 10, which illustrates clean status indications 900 when stall optimization is not enabled according to some embodiments. In this case, the five-stage instruction that begins to execute in C1 will result in a pipeline stall—even though it is followed by another five-stage instruction (beginning in C2). As a result, whenever an instruction completes execution (e.g., after C5), the clean status indication will be YES (and the pipeline can be cleared and restarted cleanly).

Network Processor

Figure 11:
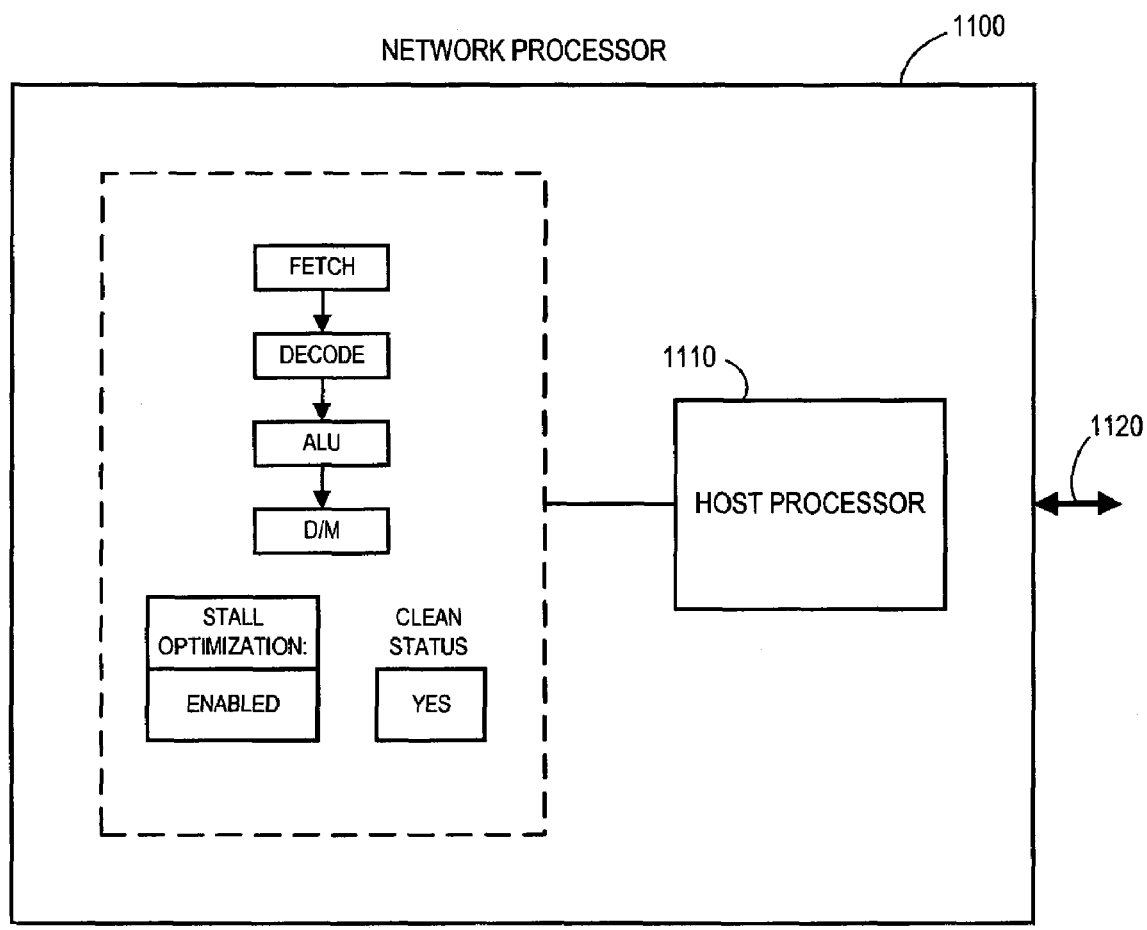
FIG. 11 is a block diagram of a network processor according to some embodiments.

FIG. 11 is a block diagram of a network processor 1100. According to this embodiment, a pipeline within the network processor 1100 is associated with a Reduced Instruction Set Computer microprocessor that performs low-level data PHY processing for Asynchronous Transfer Mode (ATM) information (e.g., a programmable state machine). For example, the RISC microprocessor may be used to process Universal Test and Operations PHY Interface for ATM (UTOPIA) information in accordance with ATM Forum document AF-PHY-0017.000 entitled "UTOPIA Specification Level 1, Version 2.01" (March 1994). Moreover, the RISC microprocessor pipeline may operate in accordance with any of the embodiments described herein (e.g., the pipeline might use stall optimization, allow the stall optimization to be disabled, and/or provide a clean status indication).

The network processor 1100 also includes a host processor 1110 to facilitate an exchange of information with at least one remote device (e.g., via a UTOPIA interface 1120 and/or an ATM switch fabric).

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although some embodiments have been described with respect to the ATM protocol, other embodiments may be associated with other protocols, including Internet Protocol (IP) packets exchanged in accordance with a System Packet Interface (SPI) as defined in ATM Forum document AF-PHY-0143.000 entitled "Frame-Based ATM Interface (Level 3)" (March 2000) or in Optical Internetworking Forum document OIF-SPI3-01.0 entitled "System Packet Interface Level 3 (SPI-3): OC-48 System Interface for Physical and Link Layer Devices" (June 2000). Moreover, Synchronous Optical Network (SONET) technology may be used to transport IP packets in accordance with the Packets Overt SONET (POS) communication standard as specified in the Internet Engineering Task Force (IETF) Request For Comment (RFC) 1662 entitled "Point to Point Protocol (PPP) in High-level Data Link Control (HDLC)-like Framing" (July 1994) and RFC 2615 entitled "PPP over SONET/Synchronous Digital Hierarchy (SDH)" (June 1999).

Moreover, embodiments might be associated with a core processor that exchanges information with a number of coprocessors. The core processor might be, for example, a RISC microprocessor associated with low-level data processing in the physical layer of the Open Systems Interconnection (OSI) Reference Model as described in International Organization for Standardization (ISO)/International Electrotechnical Commission (IEC) document 7498-1 (1994). The coprocessors might, for example, provide a PHY interface to a data stream or hardware assistance for processing tasks. In addition, the core processor may communicate with the coprocessors via a coprocessor bus. The core processor may use the coprocessor bus, for example: to request data from a coprocessor; to request to set a value in a coprocessor; or to request that a coprocessor perform an operation, such as to increment a value in the coprocessor. The operation of the core processor might be facilitated in accordance with any of the embodiments described herein.

The several embodiments described herein are solely for the purpose of illustration. Persons skilled in the art will recognize from this description other embodiments may be practiced with modifications and alterations limited only by the claims.

What is claimed is:

1. A method, comprising:
   determining a number of stages associated with a first instruction to be executed via a processor pipeline;
   executing the first instruction;
   determining a number of stages associated with a subsequent instruction, wherein the pipeline may be stalled based on the number of stages associated with the first instruction and the number of stages associated with the subsequent instruction;
   stopping the processor pipeline;
   indicating to a user whether the pipeline can be cleared and restarted, wherein a determination that the pipeline can be cleared and restarted is based on the number of stages associated with the first instruction and the number of stages associated with the subsequent instruction; and
   resuming operation of the processor pipeline, by the user.

2. The method of claim 1, wherein the subsequent instruction is the next instruction and the pipeline can be cleared and restarted if the next instruction has fewer stages than the instruction to be executed.

3. The method of claim 1, wherein the instruction to be executed is associated with a fetch stage, a decode stage, an arithmetic-logic unit stage, and a plurality of data/memory stages and the subsequent instruction is associated with a fetch stage, a decode stage, an arithmetic-logic unit stage, and a data/memory stage.

4. The method of claim 1, wherein the pipeline is associated with a reduced instruction set computer microprocessor in a network processor.

5. An apparatus, comprising:
   a storage medium having stored thereon instructions that when executed by a machine result in the following:
   determining a number of stages associated with a first instruction to be executed via a processor pipeline;
   executing the first instruction;
   determining a number of stages associated with a subsequent instruction, wherein the pipeline may be stalled based on the number of stages associated with the instruction to be executed and the number of stages associated with the subsequent instruction;
   stopping the processor pipeline;
   indicating to a user whether the pipeline can be cleared and restarted, wherein a determination that the pipeline can be cleared and restarted is based on the number of stages associated with the first instruction to be executed and the number of stages associated with the subsequent instruction; and resuming operation of the processor pipeline, by the user.

6. The apparatus of claim 5, wherein the pipeline is to be cleared and restarted if the subsequent instruction has fewer stages than the instruction to be executed.

7. A method, comprising:
   determining a number of stages associated with a first instruction to be executed via a processor pipeline;
   executing the first instruction;
   determining a number of stages associated with a subsequent instruction, wherein the pipeline may be stalled based on the number of stages associated with the instruction to be executed and the number of stages associated with the subsequent instruction;
   determining if stall optimization is enabled;
   if stall optimization is not enabled, stalling the pipeline based on the number of stages associated with the instruction to be executed;
   if stall optimization is enabled, indicating to a user whether the pipeline can be cleared and restarted, wherein a determination that the pipeline can be cleared and restarted is based on the number of stages associated with the first instruction to be executed and the number of stages associated with the subsequent instruction; and
   resuming operation of the processor pipeline, by the user.

8. The method of claim 7, wherein if stall optimization is not enabled, the pipeline is to be stalled if a subsequent instruction could have fewer stages than the instruction to be executed.

9. An apparatus, comprising:
   a storage medium having stored thereon instructions that when executed by a machine result in the following:
   determining a number of stages associated with a first instruction to be executed via a processor pipeline;
   executing the first instruction;
   determining a number of stages associated with a subsequent instruction, wherein the pipeline may be stalled based on the number of stages associated with the instruction to be executed and the number of stages associated with the subsequent instruction;
   determining if stall optimization is enabled;
   if stall optimization is not enabled, stalling the pipeline based on the number of stages associated with the instruction to be executed;
   if stall optimization is enabled, indicating to a user whether the pipeline can be cleared and restarted, wherein a determination that the pipeline can be cleared and restarted is based on the number of stages associated with the first instruction to be executed and the number of stages associated with the subsequent instruction; and resuming operation of the processor pipeline, by the user.

10. The apparatus of claim 9, wherein if stall optimization is not enabled, the pipeline is to be stalled if a subsequent instruction could have fewer stages than the instruction to be executed.

11. The apparatus of claim 9, wherein the indication is provided if an instruction's first data/memory stage has been completed while a second data/memory stage has not been completed.

* * * * *